(12) United States Patent
Kaye

(10) Patent No.: US 7,343,553 B1
(45) Date of Patent: Mar. 11, 2008

(54) VOICE CLIP IDENTIFICATION METHOD

(76) Inventor: Evan John Kaye, 145 E. 81st St. Apt. 3C, New York, NY (US) 10028

( * ) Notice: Subject to any disclaimer, the term of this patent is extended or adjusted under 35 U.S.C. 154(b) by 889 days.

(21) Appl. No.: 09/634,339

(22) Filed: Aug. 8, 2000

Related U.S. Application Data

(60) Provisional application No. 60/205,960, filed on May 19, 2000.

(51) Int. Cl.
*G06F 15/00* (2006.01)
*G06F 17/30* (2006.01)
*G06F 15/16* (2006.01)
*B26D 5/08* (2006.01)

(52) U.S. Cl. .................. 715/513; 715/501.1; 709/203; 707/6; 84/609

(58) Field of Classification Search ............... 715/513, 715/516, 523, 501.1, 517, 752, 500.1, 514, 715/526; 704/244, 270; 705/10, 26, 27; 709/217, 218, 203, 223, 231, 219, 200, 202; 707/6, 104.1, 102, 3; 345/788; 84/609, 84/615, 668, 649; 273/243; 463/42
See application file for complete search history.

(56) References Cited

U.S. PATENT DOCUMENTS

| | | | | |
|---|---|---|---|---|
| 5,695,400 | A * | 12/1997 | Fennell et al. ................. | 463/42 |
| 5,874,686 | A * | 2/1999 | Ghias et al. ................... | 84/609 |
| 5,930,768 | A * | 7/1999 | Hooban ........................ | 705/27 |
| 6,247,130 | B1 * | 6/2001 | Fritsch ........................ | 713/171 |
| 6,343,990 | B1 * | 2/2002 | Rasmussen et al. .......... | 463/25 |
| 6,349,942 | B1 * | 2/2002 | Solboe ........................ | 273/243 |
| 6,484,199 | B2 * | 11/2002 | Eyal ............................ | 709/223 |
| 6,504,089 | B1 * | 1/2003 | Negishi et al. ............... | 84/609 |
| 6,539,395 | B1 * | 3/2003 | Gjerdingen et al. ........ | 707/102 |
| 6,678,680 | B1 * | 1/2004 | Woo ............................. | 707/6 |
| 7,075,000 | B2 * | 7/2006 | Gang et al. ................... | 84/600 |
| 2001/0025259 | A1 * | 9/2001 | Rouchon ...................... | 705/26 |
| 2001/0042107 | A1 * | 11/2001 | Palm .......................... | 709/218 |
| 2002/0054134 | A1 * | 5/2002 | Kelts .......................... | 345/788 |
| 2002/0073098 | A1 * | 6/2002 | Zhang et al. ............. | 707/104.1 |
| 2003/0229537 | A1 * | 12/2003 | Dunning et al. .............. | 705/10 |
| 2004/0093249 | A1 * | 5/2004 | Chacker ........................ | 705/7 |
| 2005/0101386 | A1 * | 5/2005 | Lavanchy et al. ............ | 463/42 |

FOREIGN PATENT DOCUMENTS

WO    WO 01/20483 A2 *    3/2001

OTHER PUBLICATIONS

D. Gibson: "Name That Clip, Music retrieval using audio clips," Disclosed at public conference in Berkeley, California, Aug. 1999, pp. 1-10.*

(Continued)

*Primary Examiner*—William Bashore
*Assistant Examiner*—Maikhanh Nguyen

(57) ABSTRACT

The present invention provides an interactive method for people to assist one another in identifying titles to songs, artists of songs, or both. The method is preferably performed over a distributed computer network such as the Internet, with some users providing voice clips and others responding with proposed artist or song name identifications corresponding to the voice clip. The voice clip author, in addition to being provided the song name and/or artist, also can be provided with portions of the actual song, the entire song, other tracks from an album or compact disc ("CD"), and perhaps other information concerning the artist, song, era of music, or other relevant content once one or more other users have provided matching identification responses. Users can be further provided with an opportunity to purchase songs, albums, cassettes, CDs or other media containing music through a vendor on the Internet.

4 Claims, 9 Drawing Sheets

OTHER PUBLICATIONS

N. Kosugi et al., "A Practical Query-By-Humming System for a Large Music Database," Proceedings of the eighth ACM International conference on Multimedia, 2000, pp. 333-342.*

R. McNab et al., "The New Zealand Digital Library MELody inDEX," D-Lib Magazine, May 1997, pp. 1-10.*

"Gracenote: Frequently Asked Questions", retrieved Mar. 20, 2001, pp. 1-19.*

* cited by examiner

VOICE CLIP IDENTIFICATION METHOD

This application claims priority under 35 U.S.C. Section 119 to co-pending U.S. Provisional Application No. 60/205,960, filed May 19, 2000, which is hereby incorporated by reference in its entirety.

FIELD OF THE INVENTION

The present invention relates to methods for matching a voice clip entered into a computer with a song name or artist.

BACKGROUND OF THE INVENTION

Many people hear tunes in their heads but do not know the name of the tune or the artist that created it. The tune can be a favorite from childhood or a current radio hit. One approach to learning the identity of the song is to ask friends, record sales people, or disc jockeys the name of the song or artist.

In recent times, the Internet has become a useful tool for people to exchange information and purchase goods and services using an Internet compliant device such as a home computer, personal digital assistant (PDA), or other device. However, no methods have been provided to assist people in using the Internet as a tool to match a voice clip to a song name or an artist.

What remains needed in the art is a method which assists persons to learn the identity of songs or artists with minimal inconvenience. What is further needed in the art and has heretofore not been available is such a method which fosters a community of users at selected websites and increases the stickiness of such websites. Also, what remains needed is a method by which a user wishing to purchase music from an online vendor and does not know the name/artist is able to have the tune identified for the purpose of making a purchase. The present invention satisfies these and other needs.

SUMMARY OF THE INVENTION

The present invention provides a method for people with a common interest in music to interact through the auspices of the Internet and assist one another in identifying titles to songs, or the song's artists, or both. Once an artist or song is identified, users of the inventive method can be provided with portions of songs, the entire song, other tracks from an album or compact disc ("CD"), further information concerning the artist or the song or the era of music, or a combination of these as well as other relevant content. Users of the inventive method can be further provided with an opportunity to purchase songs, albums, cassettes, CDs or other media containing music through a vendor on the Internet.

In one aspect of the invention, a method is disclosed for identifying the name of a song input by a first user. The method includes inputting a voice clip of a portion of the song into a microphone connected to a client machine. The method can prompt or otherwise enable the user to do so. The voice clip is then provided to a server connected to the Internet. The user can selectively provide further information relating to the song, such as the genre or era of the music. Thereafter, the user receives at his or her machine an electronic notification from the server that the song or the songs' artists has been identified. The notification can include a hypertext link to a predetermined page displayable or constructable by the server, and can include either the name of the song or the artist, a clip from the actual song, or only prompt the user to visit a designated site on the Internet.

In a related aspect of the invention, a method is disclosed for identifying the name of a song input into a microphone of a telephone as a voice clip by a first user. The first user also provides first user identification information. The voice clip is then provided to a server connected to the Internet. The user can selectively provide further information relating to the song, such as the genre or era of the music. Thereafter, the user receives an electronic notification from the server that the song or the song's artist has been identified. The electronic notification is received at a client machine in response to receipt of the first user identification information, and can include a hypertext link, the name of the song or artist, a clip from the actual song, or prompt the user to visit a designated site on the Internet, as described above.

Also in a related aspect, the invention provides a method for other users to listen to voice clips that have been posted to a designated server and attempt to identify the songs through the voice clips. Such users can be rewarded for assisting the voice clip author in identifying the song.

A further aspect of the invention provides a method for fostering a community of users at a website which includes music-related content. According to that method, a voice clip is downloaded to a user at a client station from the website and played at a client machine. The user selectively provides a response to the Web server, with the response including a song name or artist's name. The user is awarded a benefit for the response, provided that predetermined criteria are satisfied. For example, a benefit results if the user's response matches a predetermined number of other responses received from other users regarding the same voice clip.

These and other features, aspects and advantages of the present invention can be further appreciated from the accompanying Figures, Description of the Figures and Detailed Description of the Preferred Embodiment.

DETAILED DESCRIPTION OF THE PREFERRED EMBODIMENT

By way of overview and introduction, a method in accordance with a preferred embodiment of the present invention provides a simple three-step process by which a user provides a sample voice clip, enters what he or she knows about a song and submits the voice clip to a designated Web server. In like manner, the invention provides in the preferred embodiment a three-step process for enabling a visitor of the designated website to select the types of music that he or she knows best, listen to a selection of voice clips provided by other users, and either identify a song corresponding to the voice clip or listen to further voice clips. Awards can be provided for identifying the original recording artist or song title represented by the voice clip.

Figure 1:
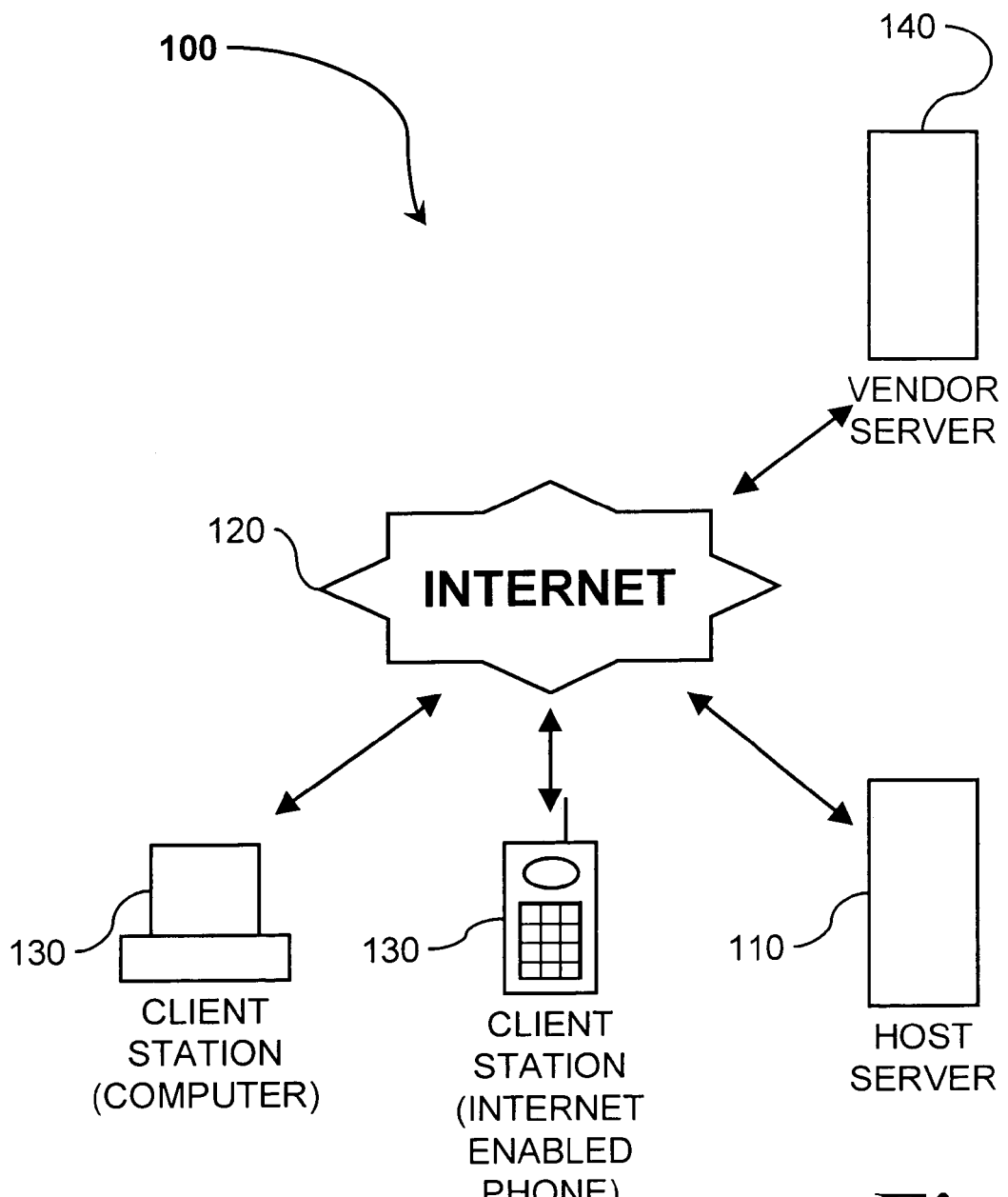
FIG. 1 illustrates a network arrangement of hardware components for implementing a method in accordance with a preferred embodiment of the invention.

With reference now to FIG. 1, a network arrangement for implementing a method in accordance with the present invention is described. The network 100 includes a host server 110 which provides content over the Internet 120 to a plurality of distributed users that access the host server 110 through client stations or machines 130. The content provided by the host server 110 can be viewed by users through a Web browser or other functionally equivalent software running at their respective client stations 130. In addition to content, the host server 110 downloads and executes a software application on the client station 130 which implements the method of the preferred embodiment, as described below in connection with FIGS. 2-6. Alternatively, the client station can provide information to the host server for processing at host server. The client stations or machines 130 can assume a variety of forms, including a home computer, a PDA, an Internet compliant telephone, or other Internet compliant communications device.

The host server 110 can be configured to support electronic commerce and provide goods and/or services for purchase or lease by the users who access it. Alternatively, e-commerce services can be provided by a different server, such as by a vendor server 140. The host server 110, the vendor server 140, and the plural client stations 130 are all configured to communicate with one another in a conventional manner over communication link through the Internet 120. In lieu of the Internet, communications can be through an Intranet or Extranet, as understood by those of skill in the art.

Figure 2:
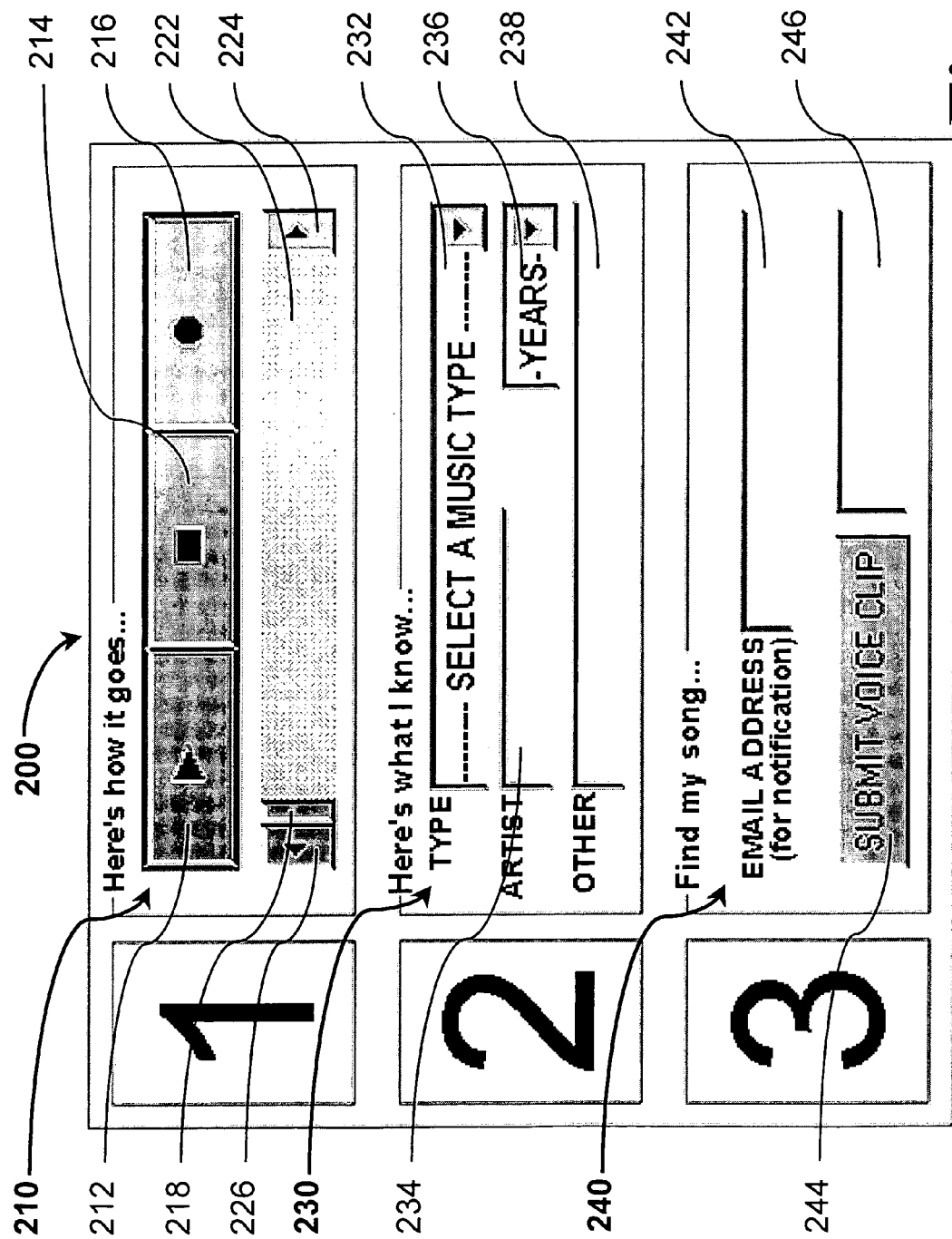
FIG. 2 shows an exemplary form for entering a voice clip in accordance with the preferred embodiment of the invention.

FIG. 2 illustrates an exemplary form for inputting a voice clip in accordance with the preferred embodiment of the invention. The form 200 is posted to a client station 130 in response to a user processing at the host server 110 and requesting to enter a voice clip. The form itself can comprise an HTML file having form tag pairs and suitable input fields between the form tags or can be implemented as an Active X or other component which executes on the client's station 130. The form 200 is generally divided into three regions, with each region representing one of the three general steps described at the outset to provide a voice clip to a designated server such as the host server 110.

The user enters how the song sounds by providing a voice clip through interaction with field 210. This is done by recording the voice clip into a microphone connected to the client station. If the client station is an Internet compliant telephone, the user simply sings into the microphone of the telephone. If the client station is a home computer or other device, then a microphone attached to that machine is the input device that the user uses to input the voice clip. A series of buttons are provided to permit playback (button 212), stopping (button 214), and recording (button 216) of voice clips. In addition, a scroll bar 218 is provided to advance or replay an already recorded voice clip by sliding the scroll bar within the region 222. Fast forward and rewind buttons 224, 226 are also provided to further assist the user in reviewing a previously recorded clip. Upon pressing the record button 216, the microphone connected to the client station is activated and a voice clip of the user is captured within the client station 130 or conveyed to the host server 110 for remote data capture. While the player is in the record mode, the scroll bar 218 advances within the region 222, indicating to the user the relative amount of time remaining for the recording.

The user also enters what he or she knows about the song in field 230. The user selects a music type and enters that in text box 232. Preferably, the types of music that the user can select are predetermined and are selectable from a pull-down list. If the user knows the artist's name, then that information can be entered in text box 234. Likewise, the approximate year or year range that the music first appeared can be entered in text box 236, which preferably is a pull-down selection list. If the user has any other pertinent information concerning the song, that information is entered in box 238.

If the user is satisfied with the voice clip, he or she can then submit it to the host server 110. In field 240, the user apprizes the server that he or she wants to have that voice clip found, that is, matched to the recording artist, song title, or both, by submitting the voice clip. This is done in the preferred embodiment by the user entering into text box 242 his or her e-mail address and then selecting the submit voice clip button 244. As the voice clip is being transferred, field 246 can display messages to the user indicating the progress of the transfer.

Figure 3A:
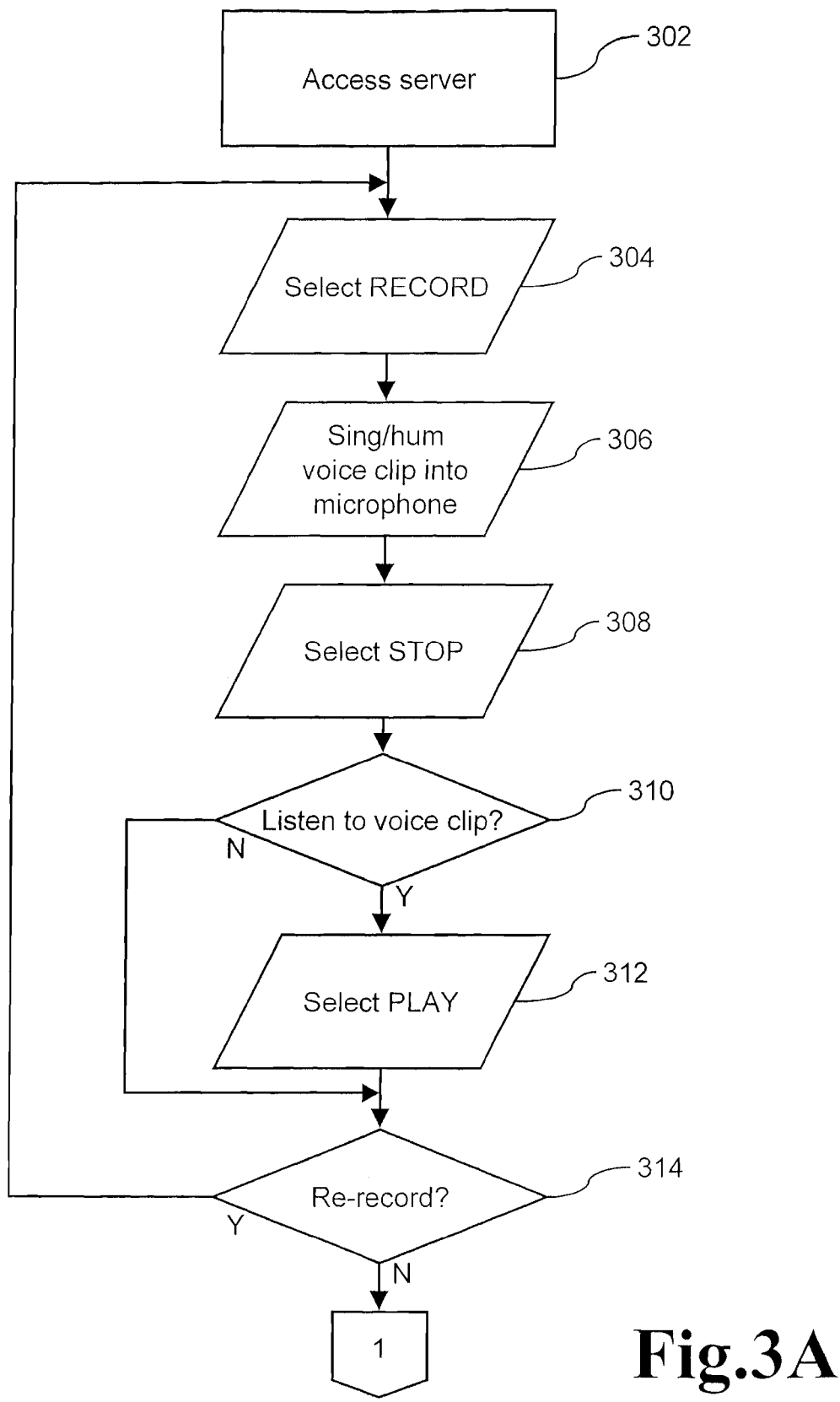
FIGS. 3A and 3B illustrate a process flow for submitting the voice clip to a web server.
Figure 3B:
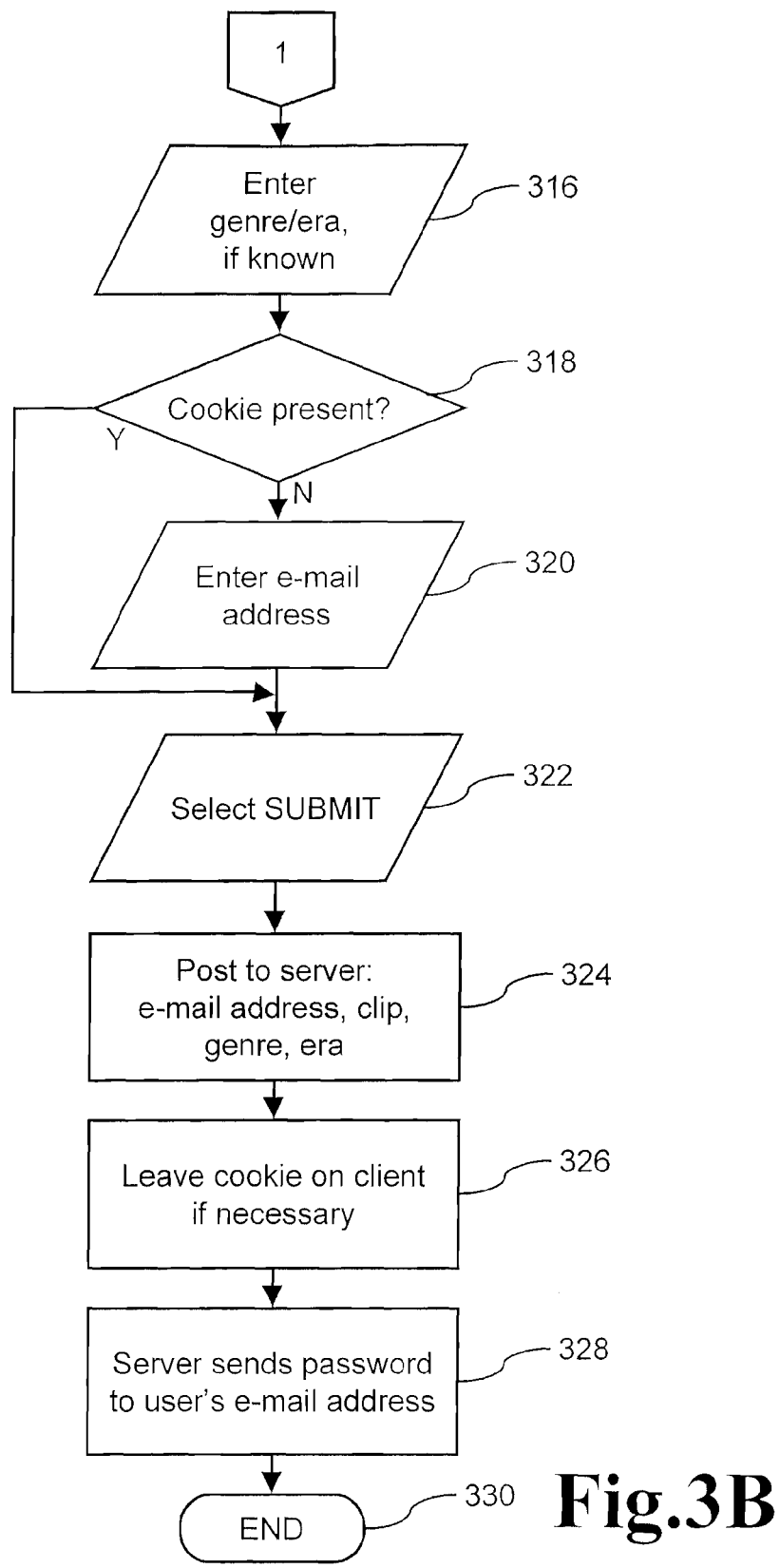

FIGS. 3A and 3B illustrate a preferred process for capturing a voice clip using the form 200. At step 302, the user accesses the host server 110 in any conventional manner. For example, the user launches a browser application and enters the URL of the host server, or selects a Web page posted by the host server by selecting a hypertext link or by clicking on an anchored image. The user provides a voice clip which represents the song to be identified, if sung well, by pressing the record button 216 to put the voice clip recorder into in the record mode, at step 304. The user sings or hums a voice clip into a microphone connected to the client station at step 306. When the recording is done, the user selects the stop button 214, as indicated at step 308. If the user wishes to listen to the voice clip, as tested at step 310, the user need only select the play button 212, as indicated at step 312. The user also may wish to re-record the voice clip, as tested at step 314, in which case the user selects the record button 216 and a new voice clip is obtained.

In FIG. 3B, the method continues by obtaining from the user information concerning what he or she knows about the song, including the genre or era of the song at step 316 by filling in the boxes 232-238 in the region 230 of the form. If the user has accessed the host server before, then it is possible that the host server has placed a cookie on the user's client station. At step 318, a test is made to see whether a cookie was sent to the host server when the user requested the form or other page from the host. If the cookie was sent, then the host server may already know the e-mail address of that user and can include that in the field 242 of the form as a default setting. If no cookie was sent, then the host server will seek e-mail address information from the user through blank text box 242 as indicated at step 320. When the form is complete, the user can press the submit button 244, as indicated at step 322, so that the form is posted to the designated server with all of the information that was entered into it, at step 324. The host server can deposit a cookie on the client station 130, at step 326, if one is not there already. In the preferred embodiment, the server sends a password to the user's e-mail address at step 328 which enables the user to retrieve matches provided by other users, as described more completely below. The process for submitting a voice clip to the host server ends at step 330.

As understood by those of skill in the art, the process flow in the context of an object-oriented environment such as the graphical interface presented on the World Wide Web, need not be executed in the order presented in a conventional flow diagram. Rather, process flows can be driven dynamically in response to user actions. Thus, the data provided in fields 210, 230 and 240 can be entered in any order prior to pressing the submit button 244. Also, as understood by those of skill in the art, a client-side Active X component, Java-Script or equivalent can be used to test the form for completeness prior to posting to the hosting server 110, with suitable prompts given to the user to guide the user toward completing the form. Field 246 displays messages to the user indicating the progress of transfer of voice clips to the server.

In an alternate arrangement, a voice clip can be submitted to the server 110 through the use of a conventional (that is, a non-Internet compliant or enabled) telephone. In this alternative arrangement, users provide voice clips through such a telephone without the use of any displayed forms, such as the form 200. Instead, the user is provided with one or more voice prompts upon accessing a call processing system, such as a voice mail or voice conversion system, as is known in the art. Thus, for example, the user can access a call processing system by dialing an "800" number, record a voice clip in response to suitable prompts, and enter user identification information and preferably also a personal identification number (PIN). If the user has never accessed the system before, or does not know his or her user identification information or PIN, if any, conventional prompting can be used to assist the user in gaining access to the system (e.g., a previously stored hint can be revealed to the user), or the user may be permitted to sign up by providing an email address and other information using either the microphone or keys on the telephone set's standard keypad. Regardless of the manner in which voice clips are submitted to the server 110, the subsequent processing, as described below, remains the same.

Figure 4:
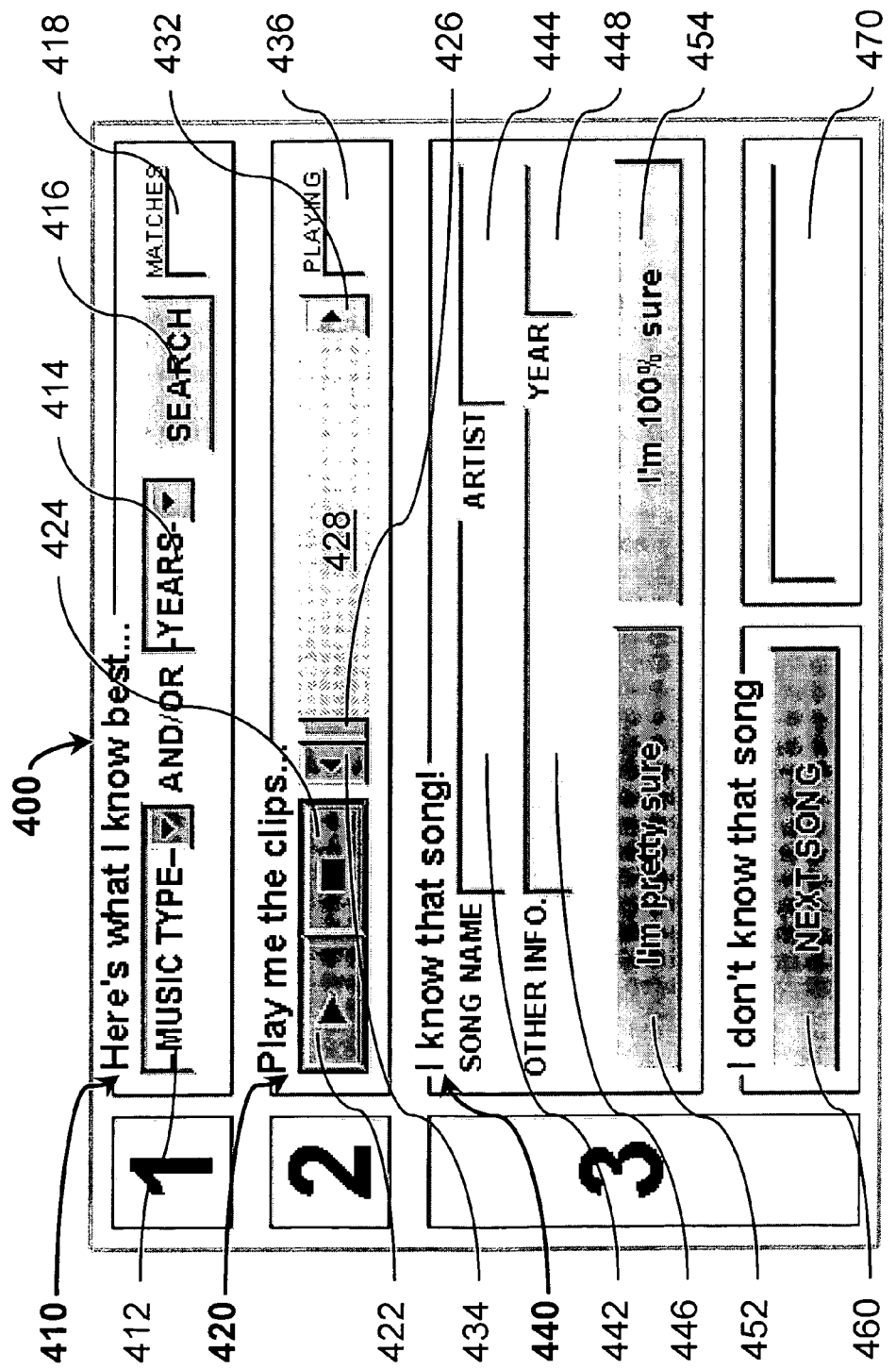
FIG. 4 shows an exemplary from for controlling voice clip play backs and submitting responses in accordance with the preferred embodiment.

With reference now to FIG. 4, a form for identifying the voice clips input by other users is presented. Form 400 presents three general fields by which a visitor to the host server 110 can identify a voice clip submitted by another user/visitor. The form 400 has various input fields included between HTML form tags or residing on an embedded component, substantially as described above in connection with form 200. A first region 410 of the form enables the visitor to enter information on the types of music that he or she knows best. In this regard, a music type selection list 412 is preferably provided to guide the visitor/user toward available music types provided by the host server 110. In addition, or alternatively, the user can enter a specific year or broader time period with which he or she is familiar, in text box 414. Preferably, this text box is also provided as a pull-down selection list. The user begins the search by selecting the search button 416. The number of matches that are retrieved based on the search parameters that were entered into boxes 412 and 414 are indicated in a display cell 418.

Region 420 provides controls that the user can manipulate to play back voice clips located in the search. These controls include a play button 422, a stop button 424, a scroll bar 426 which is movable within a region 428, and fast forward and rewind buttons 432, 434, respectively. The voice clip number in the playlist which is being played at any given moment is displayed in cell 436.

The user can either identify the song that was just played or indicate that he or she does not recognize the song that was just played by using controls within the region 440. If the user knows the song, he or she enters the song name in text box 442 and the artist name in text box 444. Any clues that were provided by the user who recorded the voice clip in the first place are displayed in text boxes 446 and 448 (the proposed year or year range for that song) to assist visitors in identifying the voice clip. The user indicates whether he or she is pretty sure or certain that the response is a match using buttons 452 and 454, respectively. On the other hand, if the user does not recognize the song, he or she can advance to the next song by selecting the next song button 460. All the while, the communications status with the host server is indicated in display box 470, this indicates to the user the status of the buffer in terms of whether subsequent voice clips in the playlist have been transferred to the client station or whether the transfer is still in progress.

Figure 5A:
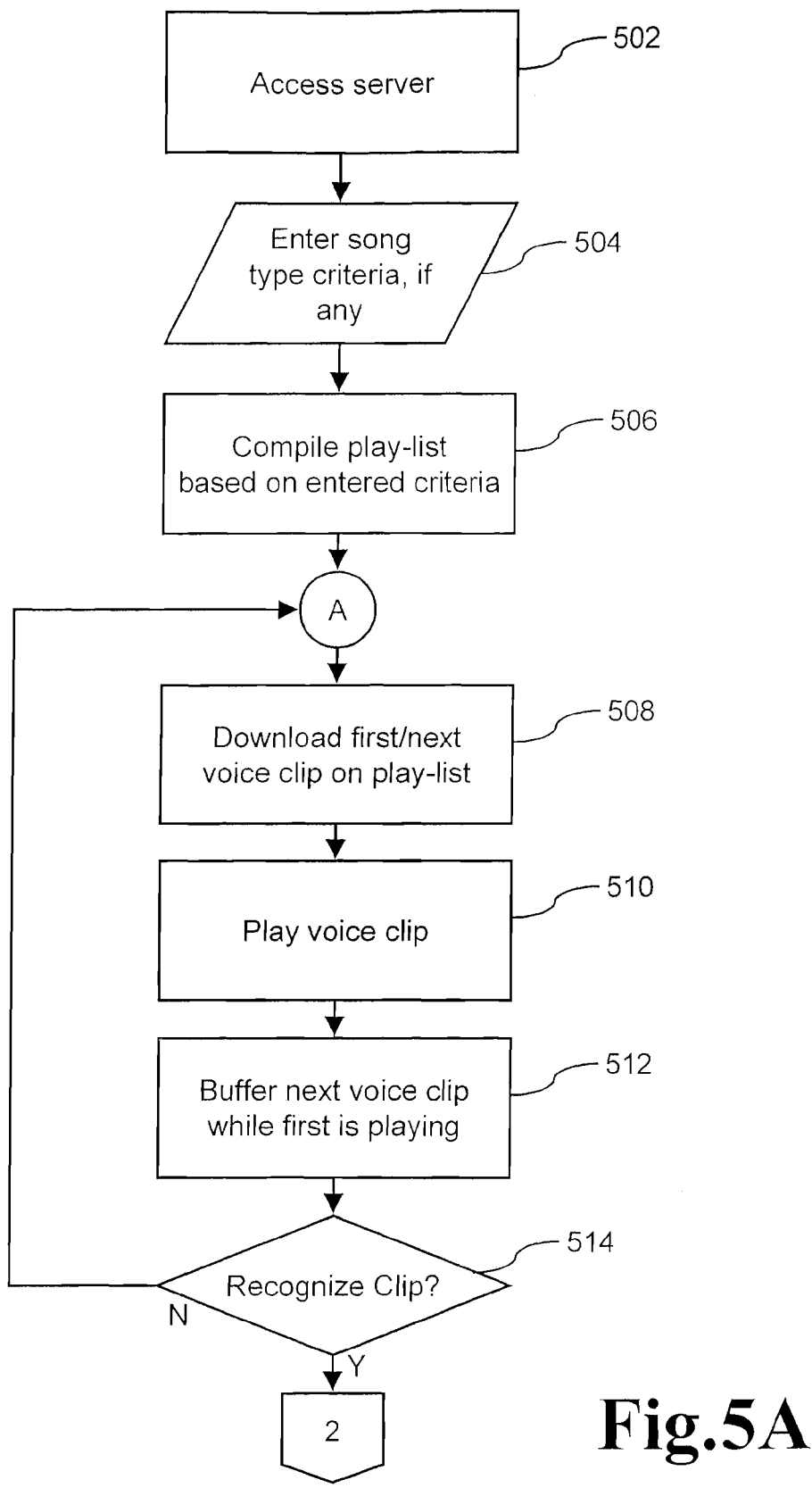
FIGS. 5A and 5B illustrate process flow for retrieving voice clips and submitting identified clips' song name or artist.
Figure 5B:
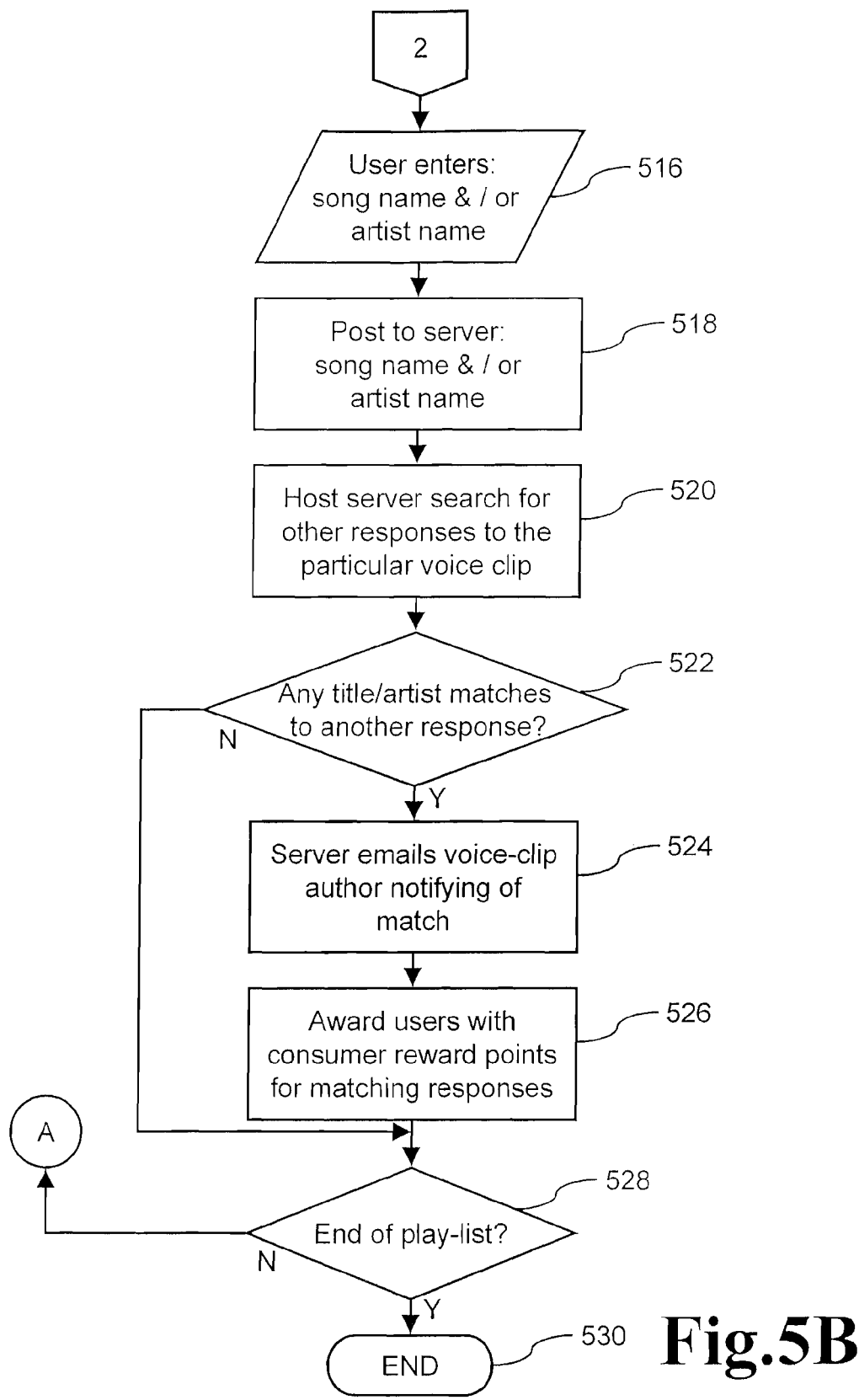

The process flow of FIGS. 5A and 5B illustrate the steps that a user takes using the form 400 to play back the voice clips entered by other users. At step 502, the user accesses the host server 110 from the client station 130, substantially described above. The user enters any song type criteria at step 504 in the box 410. The host server compiles a playlist based on any of the entered criteria at step 506 and reports the number of voice clips in the playlist in the matches cell 418. If no criteria have been entered, then all of the voice clips can be returned, or a message can be provided to the user to provide search criteria or otherwise limit the search. At step 508, a first voice clip on the playlist is downloaded to the client station 130 in response to the user selecting the play button 422. Preferably, the voice clip is played at step 510 while a next voice clip from the playlist is loaded into a buffer memory of the client station across the communication link, as indicated at step 512. The user can manipulate the song using the controls in the region 420, until he or she is ready to indicate whether the clip has been recognized.

At step 514, a test is made to see whether the clip has been recognized. If it has not been recognized, then the process loops back and the next voice clip is downloaded or played, preferably while additional voice clips are buffered into memory. On the other hand, if a voice clip is recognized, then the process flow continues with the flow of FIG. 5B.

To identify the song, the user enters the song name and/or the artist's name into the text boxes 442 and 444, as indicated at step 516. The user posts to the host server 110 the song name or artist name entered into the form 400. Depending on which of the buttons 452 and 454 was pressed, different information can be provided to the host server for example, through the use of hidden input fields included between the form tags, as understood by those of skill in the art.

At step 520, the host server searches for any other responses that were provided in response to that particular voice clip. In the event that there were other responses which match in either title or artist to the just-posted response from step 518, as tested at step 522, then the host server sends an e-mail to the voice clip author notifying him or her of the match, at step 524. The test for matches to other responses insulates the voice clip author from receiving an e-mail notification with potentially incorrect information. By matching several proposed responses first, the user-base of the host server is harnessed to authenticate the proposed responses of several different users prior to sending an e-mail notification to the voice clip author. Users that posted responses that matched the responses of other users can be provided with an award, as indicated at step 526. The reward can take the form of points that are redeemable for prizes or discounts on products or services made available by the host server 110, or another vendor such as the vendor 140.

Alternatively, or in addition, users that provided responses to voice clip authors (whether they match other responses or not) can receive awards or be enrolled in a sweepstakes and earn him or her an opportunity to win a prize. To participate in such prizes or awards, the user entering in such responses provides contact information such as an e-mail address or permits the host server to place cookies on their client stations 130 (permission can be automatic if the browser software is configured to allow cookies).

In the event that the user does not know or recognize the song, and the next song button 460 is pressed, a next match from the playlist can be played back at the client station, through speakers attached thereto, until the end of the playlist is reached, as tested at step 528. If the playlist has not come to an end, then the process flow reverts back to node A of FIG. 5A. The process ends at step 530.

Preferably, the playlist is compiled to more evenly distribute voice clips to users. In this manner, each voice clip has a greater likelihood of being heard by other users. The voice clips can be associated with a data field stored at the host server which maintains a counter of the number of plays or downloads for that voice clip. Using the counter data, the playlist can be compiled so as to better ensure that the voice clips (at least of a given genre) have the same counter value or a minimal counter value difference. Also, to better prevent repeat playback of a given voice clip to a particular user, a control, login requirement or other data can be employed to track which voice clips have already been served to that user so that, at least initially, other voice clips are served to that user.

Figure 6A:
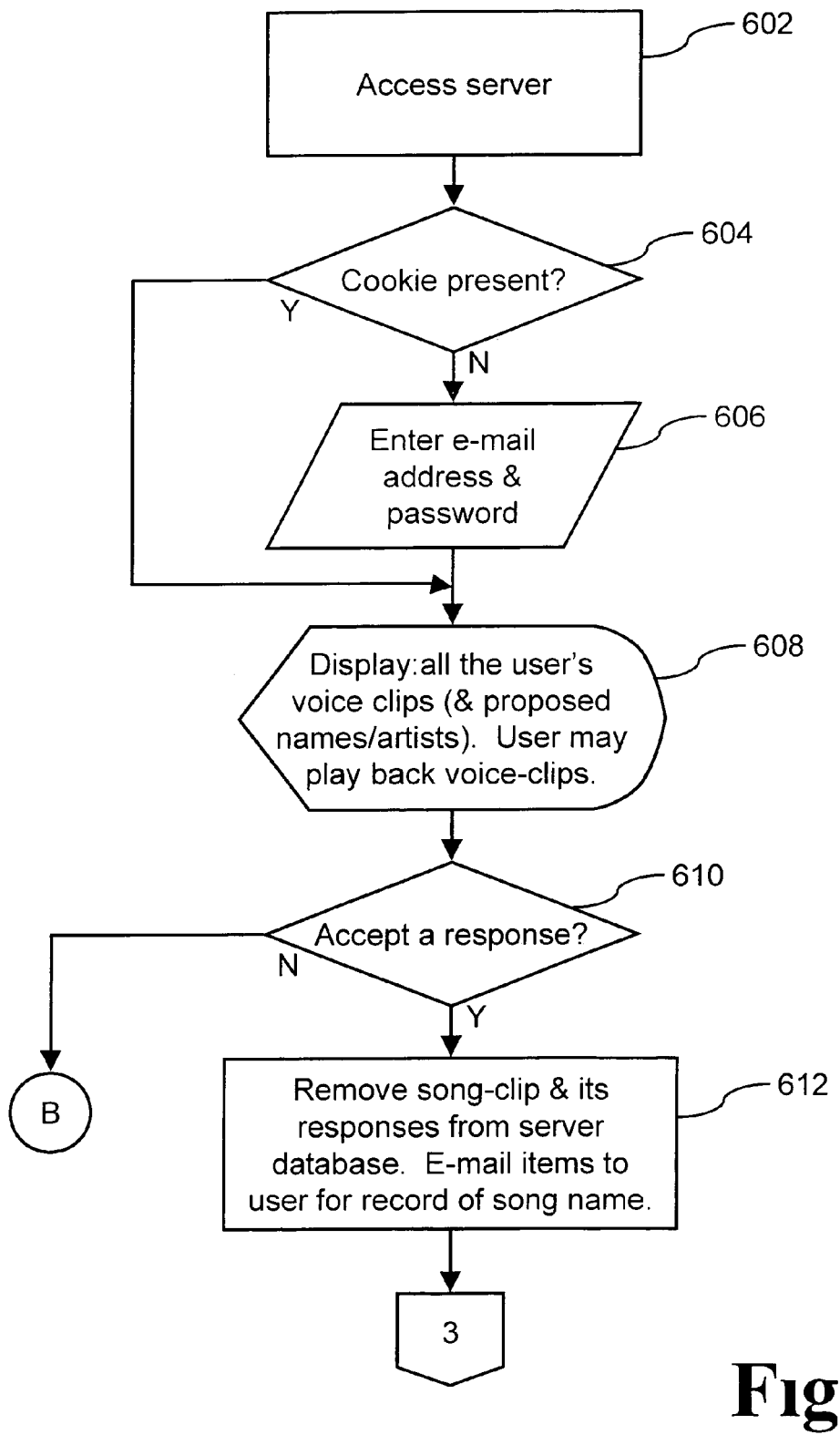
FIGS. 6A and 6B illustrate process flow for presenting tentative matches to the user in response to the user's voice clip.
Figure 6B:
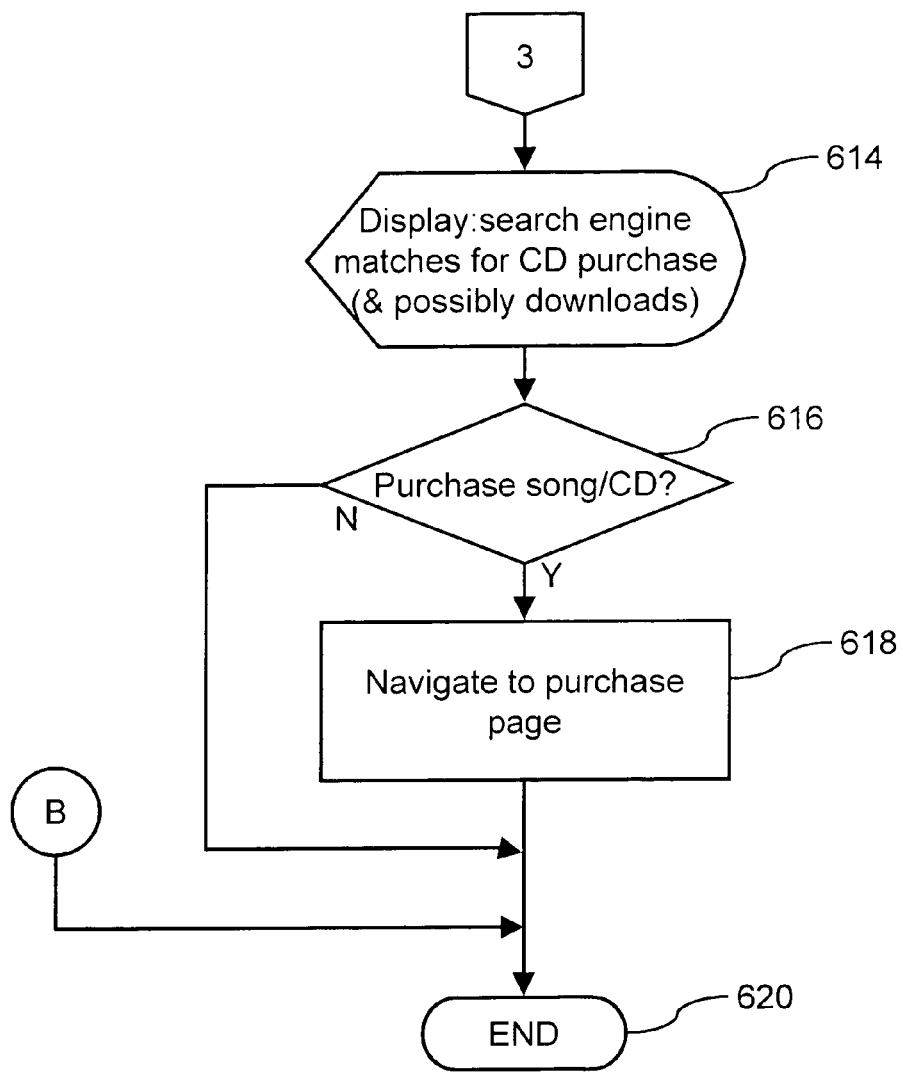

With reference now to FIGS. 6A and 6B, a process flow is described in accordance with the preferred embodiment in which matching results are provided to the voice clip author. At step 602, the voice clip author accesses the host server 110, in the manner described above. The voice clip author can access the host server for a number of reasons, including in response to the e-mail notification that may have been sent in connection with step 524 of FIG. 5B. Preferably, the e-mail notification includes an active hypertext link to the host server, and more preferably, to a response page maintained by the host server which presents the matching results to the user. In a conventional manner, when the client station of the voice clip author addresses the host server, any cookie associated with the URL is automatically provided with the Web page request. If a cookie was present, as logically tested at decision block step 604, then the data in the cookie is provided directly to the host server without intervention by the user. That data can include the e-mail address and password of the voice clip author, or a code which is associated at the host server with that user's e-mail address and password. Failing this, the user's e-mail address and password are provided to the host server at step 606, and all of the voice clips of that user, including the matching responses and perhaps non-matched responses, can be displayed to the user (optionally sorted in any conventional manner) as indicated at step 608.

A search engine processes each of the artists and songs that were identified in other users' matching responses, and displays matches to songs or compact discs (or other medium) which are available for purchase or download, at step 614. The user can play back sound clips of the actual song identified in the other users' responses using an interactive player of the type shown in FIGS. 2 and 4. Such sound clips can be accessed from a digital database, CD ROM, RAID, or other network-connected storage device which cooperates with the host server's site to provide such content. As understood by those of skill in the art, other players having fewer or greater number of functions can be provided to assist the user in playing back the sound clips. The voice clip author can play back the various sound clips that correspond to the names and artists that were identified by other persons, at step 608. If a response is accepted at step 610 by the user as a true match, then that voice clip and each of its responses can be removed from the host server database, as indicated at step 612. For example, voice clips can be deleted (1) if the voice clip author approves a matching response from another user, (2) after a prescribed period of time, (3) after a prescribed number of plays by other users, or (4) some other predetermined criterion. Also, an e-mail can be sent to the voice clip author so that the voice clip author has a record of the artist and song name. If the user does not accept the response, then he or she can play additional sound clips identified in other responses, or end the process, as indicated at step 620.

If the user elects to purchase the song or CD, as tested at step 616, the user is guided to the purchase page, at step 618, to complete the purchase transaction in a conventional manner. The process then ends at step 620, and also ends if the user elects not to purchase the song or CD.

Instead of storing voice clips at the host server 110, the voice clips can reside on the multiple client stations and be made available through a host server, once connected, for transfer to, and identification by, users at other client stations.

Also, the user trying to identify voice clips can be assisted by providing lyric searching functionality to the user interface, or providing searching functionality relating to artist lists, album lists, other users' responses, or by providing other helpful music resources along with the core functionality described above in connection with the form 400 of FIG. 4.

While the present invention has been described with respect to a particularly preferred embodiment, the invention is susceptible to implementation in other ways which are within the spirit of the invention which is defined in terms of the recitations of the appended claims and equivalents thereof.

I claim:

1. A method implemented on a network for identifying the name of a song input by a first user, the network including at least a client machine and a host server connected to the Internet, the method comprising the steps of:

accessing the host server by the first user at the client machine;

automatically receiving identification information of the first user from a cookie stored on the client machine;

sending a request, by the first user, to enter a voice clip of a portion of the song to the host sever;

transmitting a form from the host server to the client machine in response to the request by the client machine, wherein the form comprises embedded components which execute on the client machine;

inputting, though interaction with the form, the voice clip of a portion of the song into a microphone connected to the client machine;

providing the voice clip to the host server;

selectively providing, though interaction with the form, further information relating to the song to the host server;

making the voice clip and the information available to multiple human visitors to the host server;

permitting the multiple human visitors to post an identification of the song to the host server from respective machines connected to the network, the identification of the song comprising at least one of the name of the song and an artist name;

searching the posted identifications for a match of the identity of at least one of the song name and the artist name among a predetermined plurality of the identifications posted by the visitors; and in the event that a match was determined in the searching step, transmitting to the client machine an electronic notification from the host server that the song in the voice clip has been identified, wherein the electronic notification being received at the client machine in accordance with the first user identification information, wherein the electronic notification includes a hypertext link to a predetermined page constructed by the host server, and wherein the electronic notification includes at least one of the name of the song and the artist.

2. The method as in claim 1, including the additional step of issuing a benefit to those additional human users who submitted responses that had matching data.

3. The method as in claim 1, wherein the first user identification information is received automatically from the client machine upon accessing the server.

4. The method as in claim 1, wherein the first user identification information is received from the client machine in response to manual input by the first user.

* * * * *